Feb. 13, 1951 J. L. TAYLOR 2,541,306
POWER TOOL
Filed June 30, 1945 2 Sheets-Sheet 1
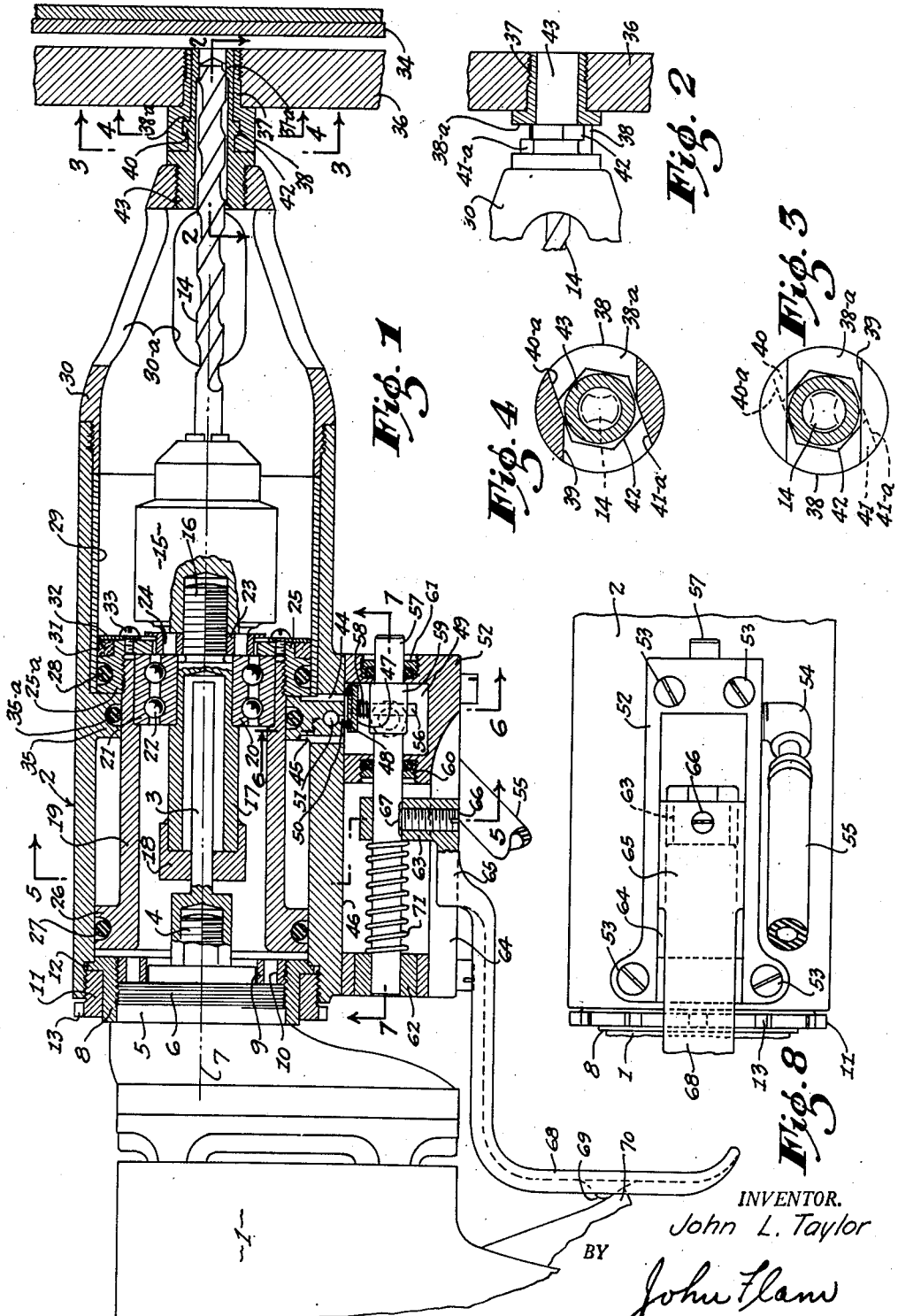
INVENTOR.
John L. Taylor
BY
John Flann
ATTORNEY Feb. 13, 1951   J. L. TAYLOR   2,541,306
POWER TOOL Filed June 30, 1945   2 Sheets-Sheet 2

INVENTOR
John L. Taylor
BY
John Flann
ATTORNEY

Patented Feb. 13, 1951

2,541,306

UNITED STATES PATENT OFFICE 2,541,306

POWER TOOL

John L. Taylor, La Habra Heights, Calif., assignor to Keller Tool Company, Grand Haven, Mich.

Application June 30, 1945, Serial No. 602,592

4 Claims. (Cl. 77—13)

This invention relates to power tools, and particularly to that type of tool which is compact and readily portable, such as drills operated by small electric motors.

Such devices are now in common use in machining operations in which the tool is guided by a drill bushing or guide formed in a template or jig. In order to cause the tool to penetrate the work, pressure must be exerted upon the tool while it is held in proper cooperative relation with the bushing.

The general object of the invention is to provide a quick detachable connection of novel and advantageous construction between the tool and the work such that the pressure exerted upon the drill or other cutting element in the performance of a machining operation is entirely sustained by such connection so as to relieve the operator from the laborious task of holding the tool to the work.

A further object is to provide a quick detachable connection of the character indicated and additionally serving to accurately position and guide the cutting element with respect to the work.

Still another object is to provide a quick detachable connection between the tool and the work of a character such that the connection is maintained by the reaction torque transmitted to the tool as an incident to the rotation of the cutting element in the work.

Figure 5:
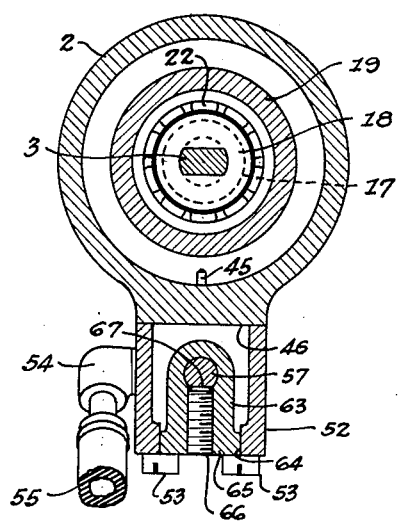
Figure 6:
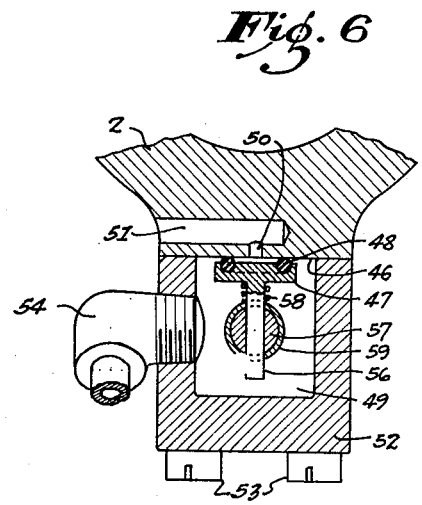
Figure 7:
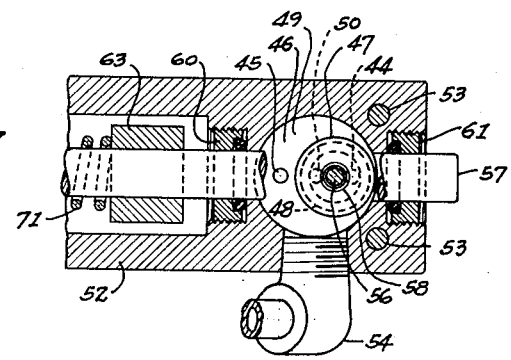

The objects of the invention thus generally stated together with other and ancillary advantages are obtained by the construction and arrangement shown by way of illustration in the accompanying drawings wherein:

Figure 1 is a longitudinal sectional view of a device incorporating the invention;

Figs. 2, 3, 4, 5, 6, and 7 are sectional views, taken along correspondingly numbered planes in Fig. 1, said Figs. 6 and 7 being drawn on an enlarged scale; and Fig. 8 is a fragmentary view, taken from the bottom of Fig. 1.

There is shown, in the present instance, a frame structure including an electric motor 1 (Fig. 1) that is adapted to support an elongated body in the form of a tubular guiding member or extension 2 (Figs. 1 and 2). The feed mechanism (to be hereinafter described) is substantially entirely enclosed in said extension 2.

A shaft 3 is arranged to be driven by the electric motor 1, as by being coupled at its left-hand extremity to a threaded shaft extension 4 driven by the motor 1. To facilitate joining the elements 3 and 4 together, the left-hand end of shaft 3 may be formed as a hexagon.

The motor 1 is connected to the tubular extension 2 by the aid of several inter-engaging threaded parts which will now be described.

Thus, the casing of motor 1 carries an extension 5, a portion of which is threaded as indicated at 6. The extension 5 is coaxial with the axis 7 of shaft 3. The threaded portion 6 engages the internal threads in the threaded collar 8, which has an exterior cylindrical surface. A hollow lock nut 9 is threaded into collar 8 from the other end of the collar, and serves to lock the threaded parts together. Nut 9 may be appropriately provided with a plurality of angularly spaced apertures 10 for the reception of a spanner wrench.

Closely encircling the outer cylindrical surface of the collar 8 is a hollow nut 11 which threads into the left-hand end of the tubular extension 2. Its inner end urges the flange 12 on collar 8 against a corresponding shoulder of the extension 2. This nut 11 may be provided with peripheral grooves or slots 13 for facilitating tightening the nut 11.

By the aid of this structure, the relative angular position of the motor 1 and tubular extension 2 can be accurately set prior to the tightening of nut 11.

The shaft 3 serves to rotate an appropriate tool, such as a drill 14. The coupling between the drill 14 and the shaft 3 includes a chuck 15 in which the stem of the drill 14 is clamped. This chuck 15 is in threaded engagement with a stud 16 carried by a sleeve member 17. This member 17 telescopes over the shaft 3 and is coupled thereto by the aid of a cap 18. The skirt of the cap may be brazed to the outer cylindrical surface of sleeve 17. The shaft 3, as shown most clearly in Fig. 5, is flattened on both sides, and the aperture in cap 18 is of similar contour. Accordingly, the tubular member 17 can be advanced and retracted with respect to shaft 3 while maintaining driving relation therewith.

The member 17 is arranged to be rotatably supported within a carriage 19 slidable within the tubular extension 2. For rotatably supporting the member 17, use is made of a thrust ball bearing structure including the inner race 20, the outer race 21, and a double row of balls 22. The inner race 20 is held against a shoulder on the exterior of the member 17 by the aid of a nut 23 that is threaded on the stud 16 and that may be provided with a plurality of angularly spaced apertures 24 for the accommodation of a spanner wrench.

The outer race 21 is also urged against a shoulder on the interior of the carriage 19 as by the aid of a ring 25 that is in threaded engagement with the right-hand extremity of the carriage 19. This ring has a portion 25—a projecting radially outwardly to form a flange around the right hand end of carriage 19.

The flange 25—a complements a similar flange 26 integrally formed at the left-hand end of the carriage 19. Each of these flanges is in sealing and sliding relation with the interior of the tubular extension 2. Accordingly, when carriage 19 is urged to move axially, the rotary chuck 15 is correspondingly moved by the thrust exerted through balls 22 of the ball bearing structure 20—21—22. For permitting this axial movement while sealing the flanges against the interior of extension 2, annular rubber seals 27 and 28 are arranged within appropriate grooves in the flanges. They are in contact with the inner periphery of the tubular portion 2. The inner periphery is partly formed by a liner 29 held in place by the aid of the cap 30 forming the nose of the tool and threaded into the right-hand end of the tubular portion 2. This cap 30 has a hollow conical contour with ventilating apertures 30—a.

A lubricant absorbing washer 31, of suitable material such as felt, may also be provided on flange 25—a, being secured by a retainer ring 32 held on the flange by screws 33. This washer 31 is to prevent metal chips and the like from drill 14 damaging the sealing ring 28 by getting between the ring 28 and liner 29.

Movement of the carriage 19 toward the right causes the drill 14 to advance toward the right and to drill apertures in the work 34. The work in this instance is illustrated as a laminar metallic structure. Similarly, retraction of the carriage 19 to the left will serve to retract the drill 14 to the position illustrated in Fig. 1.

Limits to the axial movement both toward the right and the left are imposed by the aid of an interior flange 35 integrally formed with the tubular extension 2 and located between the flanges 25—a and 26. Thus, further movement to the left in the position of Fig. 1 is stopped by engagement of the flange 25—a with the right-hand surface of flange 35. Similarly, movement of the drill 14 to the right would be stopped by engagement of the flange 26 with the left-hand side of flange 35. This flange 35 is sealed against the exterior of the carriage 19 by a rubber seal ring 35—a accommodated in a suitable groove in the flange.

In accordance with my invention, a quick detachable coupling and supporting device is provided for restraining the frame structure, including in the present instance the tubular extension 2 and cap 30, against axial movement with respect to the work 34, and also with respect to the jig or template 36. Accordingly, the frame serves to sustain the force of reaction, directed toward the left, as pressure is exerted toward the right upon the drill 14 and carriage 19.

The restraint against movement between the template or jig 36 and the tubular extension 2 includes an interlock, part of which is carried by the tool body, herein by the cap 30. The structure of these interlocking parts is best illustrated in Figs. 1, 2, 3, and 4.

Adapted for mounting in the template 36 is a guide for the tool, made in the form of a bushing 37 adapted to be mounted in the template 36 so as to constitute an anchoring bushing and herein shown as having a threaded end portion to be screwed into the template. The threads are left-hand to ensure against loosening by the reaction of the right-hand rotation of drill 14. Bushing 37 has a head 38. Cut transversely of the head 38 is a wide slot 39. On opposite sides of the slot head 38 is provided with undercut grooves forming pockets or recesses 40 and 41 (Figs. 3 and 4), which open into the slot. These pockets extend diagonally of the slot 39 to form parallel edges 40—a and 41—a, having the same spacing as the sides of slot 39. Interlocking within these pockets is a non-circular member or head 42, shown in this instance as hexagonal and providing a plurality of diametrically opposed radial projections for engagement in said pockets. This hexagonal portion 42 is formed integrally with a second relatively elongated connector bushing 43 threaded into the right-hand end of the cap 30 and serving as a guide for the drill 14 or other cutting element.

The right-hand end of the bushing 43 is cylindrical and telescopes within the bushing 37. It is provided at its right-hand extremity with a guiding portion 37—a for the drill 14.

Engagement of the hexagonal portion 42 with the pockets 40 and 41 is readily provided by first positioning the hexagonal portion 42 with a pair of opposite sides of the hexagon parallel to the sides of the slot 39; and then, as the hexagonal portion 42 engages the interior shoulder 38—a in the bushing 37, the frame 2, 30 is turned counterclockwise, as viewed in Figs. 3 and 4, to cause opposite corners of the hexagonal portion 42 to enter the pockets 40 and 41. In this way, the bushing 43 is locked against axial movement. It is locked as well against rotary movement, for the reaction torque during rotation of the drill 14 is in a direction to maintain the sides of hexagon 42 within the pockets 40, 41 and against the edge surfaces 40—a, 41—a.

The manner in which pressure is exerted to feed and retract the drill 14 to and from the work 34 may now be described. In the present instance, compressed air pressure is used for the feeding and retraction of the carriage 19.

Air under pressure can be led optionally through either of the inlet ports 44 or 45 (Figs. 1 and 7). These ports extend through the lower portion of the tubular member 2 and communicate respectively with the space to the right and left of the interior flange 35. If compressed air is permitted to enter port 44, it will be effective to urge flanges 25—a to the right for feeding the drill 14 toward the work 34. Similarly, if compressed air is permitted to enter through port 45, it will be received in the annular space between carriage 19 and tubular member 2 to act on flange 26 for retracting the drill 14.

In order to control these parts, a sliding valve structure is provided. Thus, the lower surface 46 of extension 2 (Figs. 1, 5, and 6) is a plane surface acting to provide a seat for a slide valve closure 47 (Figs. 1, 6, and 7). This slide valve structure is of disc-like form, having a peripheral groove for accommodating an annular rubber sealing member 48. The member 48 readily slides on the plane surface 46 and effectively seals the space between the closure and this surface, even when little or no lubricant is present on the surface.

The closure 47 serves optionally to permit the passage of compressed air to either of the two ports 44 or 45. In the position illustrated, port 45 is in communication with a space 49 (Figs. 1, 6, and 7) into which compressed air may be fed in a manner to be hereinafter described. Accordingly, compressed air is effective to retract the drill 14, since pressure is exerted on the right-hand side of flange 26. At the same time, port 44 is placed in communication with an exhaust port 50 by way of the space encompassed by seal 48. Exhaust port 50 communicates with a lateral port 51 (Fig. 6), exhausting the air to the external atmosphere from the space to the right of flange 35.

Movement of the slide closure 47 to the left reverses these connections. The port 44 is then uncovered, so that compressed air may pass from space 49 to the port 44 for urging the drill 14 against work 34. At the same time, port 45 is placed in communication with the exhaust port 50.

Although the carriage 19 is in sliding contact with the interior surface of the flange 35, any minor leakage of air past the sliding surfaces is inconsequential to interfere with the axial movement of this carriage.

The space 49 is formed in an exterior casing member 52 that is bolted to the lower side of the tubular portion 2, as by the aid of the cap screws 53 (see particularly Fig. 8). The member 52 has a flat upper surface contacting surface 46. The space 49, as shown most clearly in Fig. 7, is cylindrical, and is connected as by an elbow 54 to an air hose 55. The valve closure 47 is shown as provided with a stem 56 that extends radially through a slidable valve controlling rod 57. A light coil spring 58 (Fig. 6) is disposed around the stem in order to provide a slight pressure for causing good contact to be made between the annular sealing member 48 and the plane surface 46, even in the event there be no fluid pressure in space 49. Furthermore, in order to provide definite limits to the axial movement of the rod 57, a sleeve 59 is disposed around the rod 57 and is keyed thereto by the passage of stem 56 diametrically through the sleeve. The right-hand side of sleeve 59 is in contact with the right-hand side of space 49 in the position illustrated in Fig. 1; and, similarly, when the rod 57 is pulled toward the left to cause compressed air to pass through port 45, the left-hand side of sleeve 59 will contact with the left-hand side of the recess 49.

Rod 57 is guided in the walls of the recess 49, as by the aid of packing gland structures 60 and 61 formed around the rod 57. The left-hand end of the rod 57 is furthermore guided in a bushing 62 formed in the end wall of the casing 52.

The valve structure illustrated is disclosed and claimed in my application filed June 30, 1945, as Serial No. 602,593 and entitled "Control Valve."

For manipulating the rod 57 for controlling closure 47, a trigger device may be utilized. This trigger device has a boss 63 through which the rod 57 passes. The bottom of the casing 52 is slotted, as indicated at 64, to provide a slide for an extension 65 attached to the boss 63. A headless screw 66 serves to attach the boss 63 to the rod 57. The rod 57 has an appropriate flattened portion 67, serving as a seat for the headless screw 66.

A trigger 68 is formed integrally with the member 65 for digital control by the operator. This trigger is provided with a projection 69 at its rear side, cooperating with a switch lever 70 for controlling energization of the motor 1. When the trigger 68 is free, a compression spring 71 around rod 57 serves to urge the rod 57 to its extreme right-hand position, causing full retraction of drill 14.

When the trigger 68 is pulled toward the left, as viewed in Fig. 1, the compressed air is permitted to exhaust from the space at the left-hand side of the interior flange 26; and compressed air is passed through port 44. The drill 14 is thus urged to the right. At the same time, the projection 69 operates trigger switch handle 70 to cause energization of the motor 1. So long as the trigger 68 is held in the position to cause feeding of drill 14, air pressure is effective to urge the drill 14 through the work 34. As soon as the trigger is released, however, the switch 70 is returned to open position and the rod 57 is urged by the spring 71 to the position illustrated in Fig. 1. The compressed air to the right of flange 35 passes outwardly through port 44 into the exhaust port 50. At the same time, compressed air from space 49 is passed through the port 45 to cause retraction of the drill 14.

The inventor claims:

1. A coupling and supporting device for a tool having a frame and means for imparting feeding and retracting movements to a cutting element axially of the frame; said device comprising a guide exterior of the frame; said guide having a slot; and a cooperating interlocking member carried by the frame for engaging the sides of the slot, thereby aligning the tool with the guide; said slot being wide enough to permit entry of the interlocking member therein; said slot communicating with a pocket in the guide for the entry of the interlocking member and for restraining relative axial motion between the interlocking member and the guide.

2. A coupling and supporting device for a tool having a body with a forward nose portion and power driven means for driving and reciprocating a rotary cutting element axially of said nose portion, said device comprising an anchoring bushing having at one end a threaded portion for attachment to a workpiece or other support and at its other end a head portion; and a connector bushing having at one end a threaded portion for attachment to the nose of the tool body, an elongated tubular portion telescoping into the anchoring bushing and providing a guide for the cutting element of the tool, and an intermediate head portion, one of said head portions having a pair of diametrically opposed radial projections, and the other head portion having an axially open slot dimensioned for the passage of such projections and undercut pockets for the reception of said projections upon relative rotation of the two bushings, said pockets providing surfaces engageable by said projections to limit the extent of relative rotation of the two bushings.

3. A coupling and supporting device for a tool having a body with a forward nose portion and power driven means for driving and reciprocating a rotary cutting element axially of said nose portion, said device comprising an anchoring bushing having at one end a threaded portion for attachment to a workpiece or other support and at its other end a head portion; and a connector bushing having at one end a threaded portion for attachment to the nose of the tool body, an elongated tubular portion telescoping into the anchoring bushing and providing a guide for the cutting element of the tool, and an intermediate head portion, one of said head portions having a radial projection, and the other head portion having an axial opening for the passage of said projection and an undercut groove providing a transverse locking surface engageable by the projection upon relative rotation of the two bushings to hold them against axial disengagement.

4. A coupling and supporting device for a tool having a body with a forward nose portion and power driven means for driving and reciprocating a rotary cutting element axially of said nose portion, said device comprising an anchoring bushing having at one end a threaded portion for attachment to a workpiece or other support and at its other end a head portion; and a connector bushing having at one end a threaded portion for attachment to the nose of the tool body, an elongated tubular portion telescoping into the anchoring bushing and providing a guide for the cutting element of the tool, and an intermediate head portion, one of said head portions having a radial projection, and the other head portion having an axially opening slot for the passage of said projection and an undercut pocket shaped to receive said projection upon rotation of the connector bushing relative to the anchoring bushing and serving to limit such rotation and also to lock the connector bushing against disengagement from the anchoring bushing in an axial direction.

JOHN L. TAYLOR.

REFERENCES CITED

The following references are of record in the file of this patent:

UNITED STATES PATENTS

| Number | Name | Date |
| --- | --- | --- |
| Re. 15,928 | Judy | Oct. 7, 1924 |
| 402,924 | Halsey | May 7, 1889 |
| 1,244,112 | Mackle | Oct. 23, 1917 |
| 1,410,815 | King | Mar. 28, 1922 |
| 1,831,813 | Levedahl | Nov. 17, 1931 |
| 2,103,252 | Gartin | Dec. 28, 1937 |

FOREIGN PATENTS

| Number | Country | Date |
| --- | --- | --- |
| 2,499 | Great Britain | May 26, 1882 |